United States Patent
Chou

(10) Patent No.: US 8,212,161 B2
(45) Date of Patent: Jul. 3, 2012

(54) KEYPAD ASSEMBLY FOR ELECTRONIC DEVICES

(75) Inventor: Meng-Chieh Chou, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 366 days.

(21) Appl. No.: 12/548,059

(22) Filed: Aug. 26, 2009

(65) Prior Publication Data

US 2010/0258423 A1 Oct. 14, 2010

(30) Foreign Application Priority Data

Apr. 13, 2009 (CN) .......................... 2009 1 0301521

(51) Int. Cl.
*H01H 9/26* (2006.01)
(52) U.S. Cl. .......... 200/5 A; 200/310; 345/168; 345/170
(58) Field of Classification Search .................. 200/5 A, 200/314, 310, 341; 345/156, 168–175
See application file for complete search history.

(56) References Cited

U.S. PATENT DOCUMENTS

| | | | | |
|---|---|---|---|---|
| 5,736,976 A * | 4/1998 | Cheung | ........................ | 345/168 |
| 5,988,902 A * | 11/1999 | Holehan | ..................... | 400/479.1 |
| 6,561,659 B1 * | 5/2003 | Hsu | ................... | 362/24 |
| 7,265,748 B2 * | 9/2007 | Ryynanen | ..................... | 345/175 |
| 7,488,910 B2 * | 2/2009 | Hong | ........................... | 200/310 |
| 7,677,781 B2 * | 3/2010 | Ishihara et al. | ............... | 362/602 |
| 7,880,732 B2 * | 2/2011 | Goertz | .......................... | 345/175 |
| 7,935,904 B2 * | 5/2011 | Song | ............................ | 200/310 |

FOREIGN PATENT DOCUMENTS

CN 2482137 Y 3/2002

\* cited by examiner

*Primary Examiner* — Xuong Chung Trans
(74) *Attorney, Agent, or Firm* — Altis Law Group, Inc.

(57) ABSTRACT

A keypad assembly includes a PCB, a light guiding board disposed on the PCB, a panel disposed on the light guiding board, a plurality of panel portions made of transparent material, set on the panel, a lighting device disposed on the PCB, and a sensing device disposed on the PCB. when an object touches or slides on/above the surface of the panel portion, the intensity of light sensed by the sensing device changes which causes the current of the four sensors to be changed, thus the sensing device generates a signal to complete a corresponding information input.

8 Claims, 3 Drawing Sheets

KEYPAD ASSEMBLY FOR ELECTRONIC DEVICES

BACKGROUND

1. Technical Field

The disclosure generally relates to keypad assemblies, particularly to a keypad assembly for electronic devices.

2. Description of Related Art

With development of wireless communication and information processing technologies, electronic devices such as mobile telephones and personal digital assistants (PDAs), are now in widespread use. Most of these electronic devices include a keypad therein for users to input information, such as control commands. However, the common keypad can be operated only by means of pressing it, which will easily damage the keypad for being operated too often.

Therefore, there is room for improvement within the art.

BRIEF DESCRIPTION OF THE DRAWINGS

Many aspects of the keypad assembly for electronic devices can be better understood with reference to the following drawings. The components in the drawings are not necessarily drawn to scale, the emphasis instead being placed upon clearly illustrating the principles of the keypad assembly for electronic devices.

DETAILED DESCRIPTION

Figure 1:
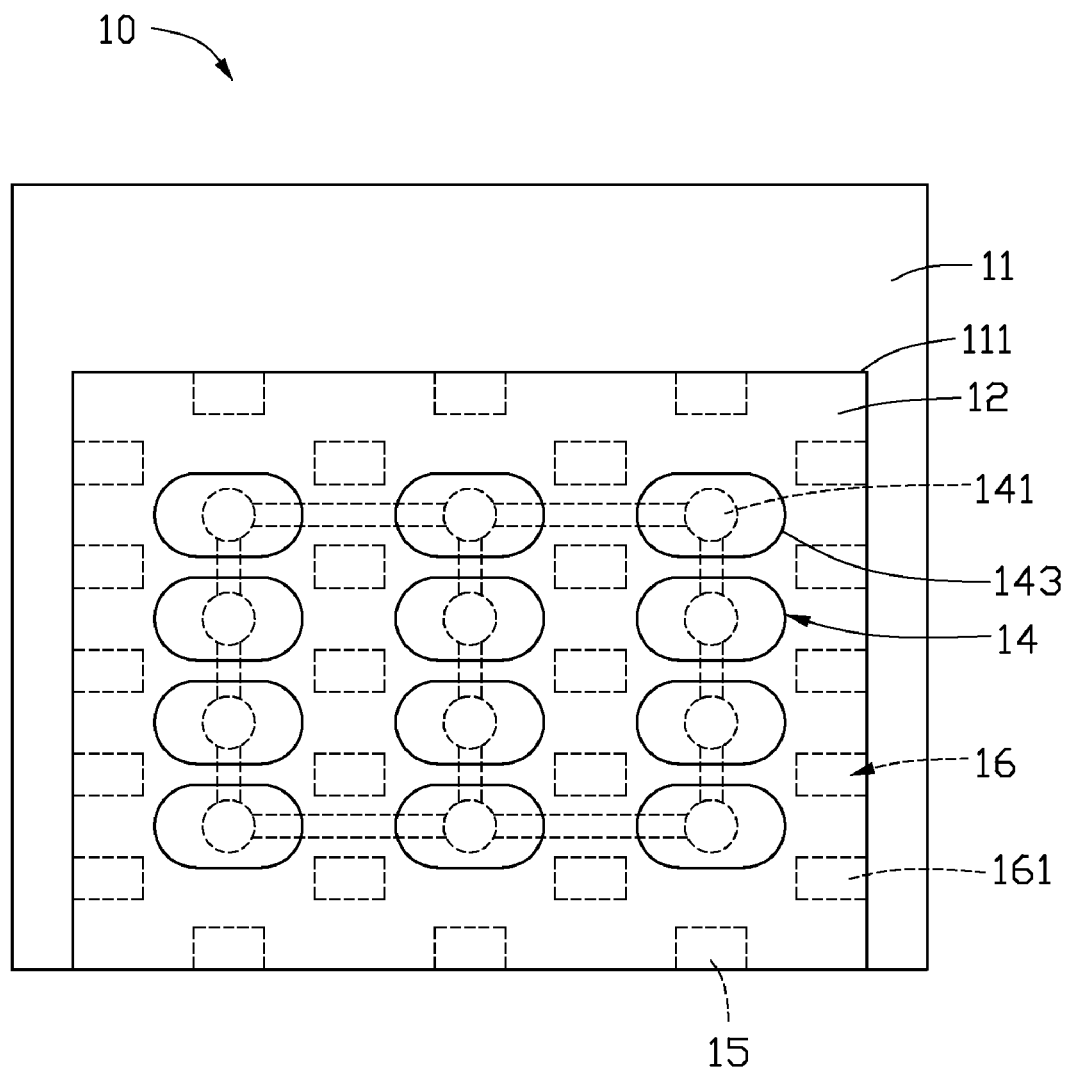
FIG. 1 shows a schematic view of a keypad assembly for electronic devices, according to an exemplary embodiment.
Figure 2:
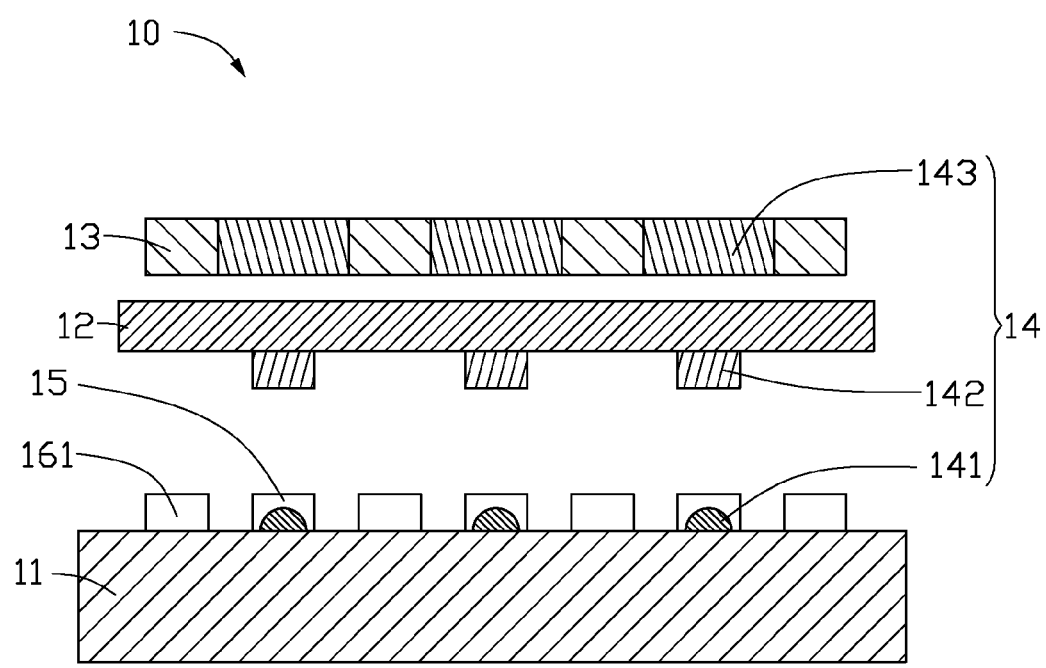
FIG. 2 shows a cross-sectional view of the keypad assembly shown in FIG. 1.

Referring to FIGS. 1-2, a keypad assembly 10 is suitably assembled in an electronic device such as a mobile phone, a personal digital assistants (PDA), or a notebook computer to input information. The keypad assembly 10 includes a printed circuit board (PCB) 11, a light guiding board 12, a panel 13, a plurality of key button assemblies 14, a lighting device 15, and a sensing device 16.

The PCB 11 is an approximately rectangular board mounted in the electronic device. A mounting area 111 is disposed on the PCB 11 to mount the light guiding board 12, the panel 13, the key button assemblies 14, the lighting device 15, and the sensing device 16. The light guiding board 12 is positioned above the PCB 11 supported by springs (not shown). The panel 13 is positioned on the light guiding board 12.

Each key button assembly 14 includes a key body 141, a rectangular protrusion 142 and a key panel portion 143. The key body 141 is disposed on the PCB 11. A metal contact (not shown) is set on the key body 141 corresponding to a touching circuit (not shown) mounted on the PCB 11. When the key body 141 is pressed, the metal point of the key body 141 causes a closed circuit with the touching circuit, and corresponding information is inputted. The protrusion 142 is set on one side of the guiding board 12 facing to the PCB 11 and corresponding to the key body 141. The key panel portion 143 is made of transparent material, and disposed in the panel 13 corresponding to the key body 141 and the protrusion 142, or formed by dividing on the panel 13. The key panel portion 143 may have at least one symbol (e.g. number) labeled therewith.

As an alternative means for inputting data and information, a lighting device 15 is disposed on the mounting area 111 of the PCB 11. In this embodiment, the lighting device 15 is formed by a plurality of light emitting diodes (LEDs schematically shown) set on the edge of the mounting area 111. The lighting device 15 is used to connect to a power source (not shown) of the portable electronic device, and lights when a user operates the keypad assembly 10 to input information.

The sensing device 16 is mounted on the mounting area 111 of the PCB 11 for converting optical signals to electronic signals. In this embodiment, the sensing device 16 is formed by a plurality of sensors 161. The sensors 161 and the key bodies 141 set on the PCB 11 are arranged in an array. Each key body 141 and four sensors 161 near it form a rectangular array with the key body 141 at the center thereof. When a user covers or uncovers from one of the panel portions 143 of a key button 14 by touching or sliding on/above it via an object such as a finger or a touch pen, the light emitted by the lighting device 15 is reflected to the corresponding four sensors 161 by the object. The intensity of the light sensed by the four sensors 161 changes which causes the current of the four sensors 161 to be changed. Thus, the four sensors 161 corresponding to the key button assembly 14 generates an information signal.

Figure 3:
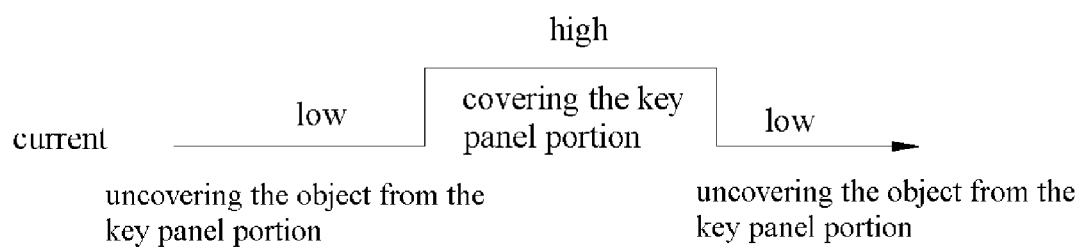
FIG. 3 shows a schematic view of current changes of a sensing device of the keypad assembly shown in FIG. 1, when it is operated by a user to input information.

Referring to FIG. 3, when a user covers or uncovers one key panel portion 143 of a key button assembly 14, the current of the corresponding four sensors 161 changes. The keypad assembly 10 determines the key panel portion 143 operated by the user according to the four sensors 161 having a changed current, and inputs the information corresponding to the operated key panel portion 143 without the user having to press any keys.

In other embodiments, the key bodies 141 and the protrusions 142 may be omitted, and the sensors 161 positioned at the four corners of each perpendicular projection of the key panel portions 143 on the PCB 11. Then, a user inputs information by only by touching or sliding on/above the key panel portions 143. There is no ability to press the keys.

In addition, the position of the sensors 161 disposed on the PCB 11 can be changed according to different information inputting requirement. For example, the sensors 161 may be disposed on the perpendicular projections of the key panel portions 143 on the PCB 11.

The keypad assembly 10 can input information by touching or sliding on/above the key panel portion 143 of the key button assembly 14 to avoid damage caused by pressing it.

It is believed that the exemplary embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A keypad assembly for electronic device, comprising:
   a PCB;
   a light guiding board disposed on the PCB;
   a panel disposed on the light guiding board;
   a plurality of key panel portions made of transparent material and set in the panel, the key panel portions arranged in a plurality of columns;
   a lighting device disposed on the PCB; and
   a sensing device disposed on the PCB, the sensing device including a plurality of sensors arranged in a plurality of columns; wherein the columns of the key panel portions alternate with the columns of the sensors; and when an object touches or slides on/above an outside surface of one of the key panel portions, the intensity of light sensed by the sensing device changes and thereby causes current generated by ones of the sensors proximate to the key panel portion to be changed, thus the sensing device generates a signal to complete a corresponding information input.

2. The keypad assembly as claimed in claim 1, wherein the lighting device is formed by a plurality of LEDs.

3. The keypad assembly as claimed in claim 2, wherein a mounting area is substantially a rectangular area set on the PCB, and the LEDs are disposed on two opposite edges of the mounting area.

4. The keypad assembly as claimed in claim 3, wherein the sensors are arranged on the other two opposite edges and between the other two opposite edges of the PCB.

5. The keypad assembly as claimed in claim 1, further comprising a plurality of key bodies and a plurality of protrusions corresponding to the panel portions, wherein the key bodies are disposed on the PCB, and the protrusions are disposed on the side of the light guiding board opposite to the PCB.

6. The keypad assembly as claimed in claim 5, wherein each key body and four sensors near it form a rectangular array with the key body near the center thereof.

7. The keypad assembly as claimed in claim 1, wherein the key panel portions and the sensors are further arranged in a plurality of rows, and the rows of the key panel portions alternate with the rows of the sensors.

8. The keypad assembly as claimed in claim 7, wherein each of the key panel portions on the PCB and four sensors proximate to the key panel portion form a rectangular array, with the key body positioned at the center of the rectangular array.

\* \* \* \* \*